March 24, 1970 R. D. HALL ET AL 3,503,014

MULTIPLE THROW MICROWAVE SWITCH

Filed Jan. 7, 1966 3 Sheets-Sheet 1

INVENTORS
WILLIAM W. NELSON
ROBERT D. HALL

BY R. C. Smith

ATTORNEY

INVENTORS
WILLIAM W. NELSON
ROBERT D. HALL

BY A. C. Smith

ATTORNEY

INVENTORS
WILLIAM W. NELSON
ROBERT D. HALL

BY R. C. Smith
ATTORNEY

United States Patent Office 3,503,014

Patented Mar. 24, 1970

3,503,014

MULTIPLE THROW MICROWAVE SWITCH

Robert D. Hall, Los Altos, and William W. Nelson, Palo Alto, Calif., assignors to Hewlett-Packard Company, Palo Alto, Calif., a corporation of California Filed Jan. 7, 1966, Ser. No. 519,349
Int. Cl. H01p 5/12
U.S. Cl. 333—7 10 Claims

ABSTRACT OF THE DISCLOSURE

At least two microwave transmission lines are connected between at least three microwave signal ports in a single or double pole multiple throw switching configuration. Each transmission line includes a low pass filter section having a pair of diodes connected in shunt with the transmission line. A control circuit is provided for reverse biasing these diodes to set the low pass filter section to a pass condition and for forward biasing them to set the low pass filter section to a stop condition. Thus, a microwave transmission path may be provided between any two of the microwave signal ports depending upon the bias condition of the diodes of each low pass filter section.

This invention relates to solid state switches and has as its main object the provision of an improved multiple-throw microwave switch.

This object is accomplished according to the illustrated embodiments of the present invention by providing at least two transmission lines each of which includes a low-pass filter section. Each low-pass filter section includes a pair of shunt diodes which function as filter capacitors when reverse biased to switch the filter section to a pass condition and as short circuits when forward biased to switch the filter section to a stop condition. The transmission lines are connected between a plurality of signal ports in a manner to provide a power transmission path between one pair of at least two different pairs of signal ports, which one pair is determined by the condition to which each of the filter sections is switched.

Other and incidental objects of this invention will become apparent from a reading of this specification and an inspection of the accompanying drawing in which.

Figure 1:
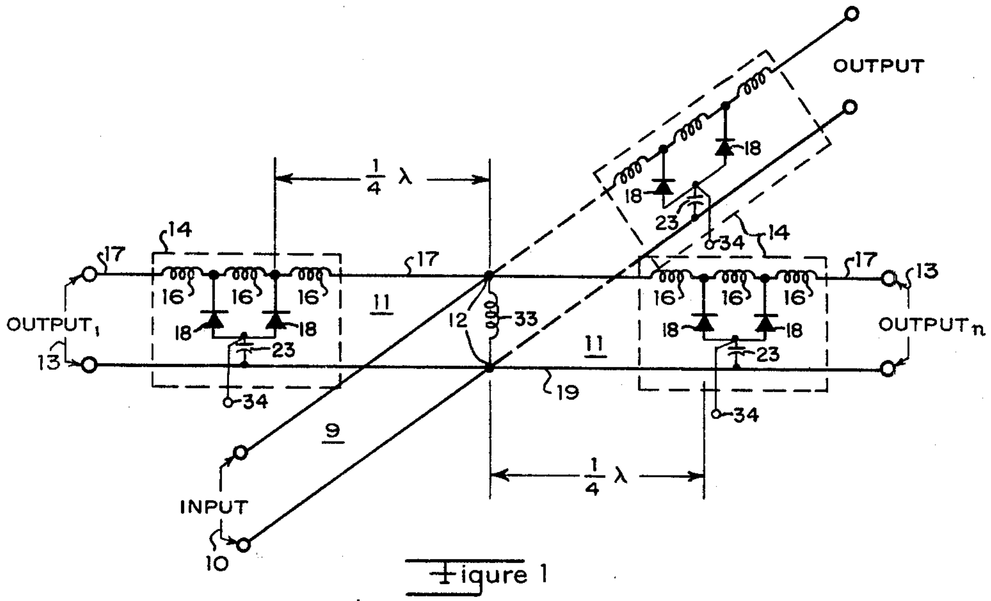
FIGURE 1 is a schematic diagram of a single-pole multiple-throw microwave switch according to one embodiment of this invention.

Referring to FIGURE 1, there is shown a single-pole multiple-throw microwave switch comprising an input transmission line 9 one end of which is connected to an input signal port 10 and the other end of which is connected in common with one end of each of a plurality of output transmission lines 11 as indicated at 12. The other end of each of the output transmission lines 11 is connected to an output signal port 13. These transmission lines 9 and 11 comprise two conductor coaxial or strip lines. The output transmission lines 11 each include a low-pass filter section 14 of the ladder network type such as, for example, a low ripple Chebyshev filter section. Each of these filter sections 14 includes three inductors 16 connected in series with one of the conductors 17 of the corresponding output transmission line 11 and includes a pair of diodes 18 poled in the same direction and connected between the two conductors 17 and 19 of the corresponding output transmission line 11 on either side of the middle inductor 16. Since ideally a reverse biased diode chip is a capacitor the diodes 18 function when reverse biased as the shunt capacitors of the filter section 14 and therefore switch the filter section to a pass condition. The insertion loss of the shunt capacitance provided by the reverse biased diodes 18 is optimally equalized over a frequency range extending from zero to a finite cutoff frequency because the diodes 18 are embedded in the low-pass filter section 14. Since ideally a forward biased diode is a short circuit the diodes 18 function when forward biased to switch the filter section 14 to a stop condition and short circuit the corresponding output transmission line 11. For each filter section 14 the diode 18 nearest to the input transmission line 9 is electrically spaced one-quarter of a wavelength, or an odd multiple of quarter wavelengths, from the common connection 12 between the transmission lines 9 and 11 so that a short-circuited output transmission line 11 appears to be open-circuited at the common connection 12. This prevents the short-circuited lines from interfering with signal transmission on the other lines.

From the preceding description it is clear that by selectively reverse or forward biasing the diodes 18 of each filter section 14 it is possible to switch the filter section characteristic from a pass to a stop condition and thereby provide power steering from the input transmission line 9 to a selected output transmission line 11. It should also be apparent that the output transmission lines 11 of the above-described microwave switch might alternatively be used as input lines and the input transmission line 9 as an output line to provide power steering from a selected input transmission line to the output transmission line. Moreover, any three of the input and output transmission lines 9 and 11, or any three of the output transmission lines 11 alone, may be combined in accordance with the above-described principles to provide a single-pole multiple-throw solid state switch.

Figures 2, 4:
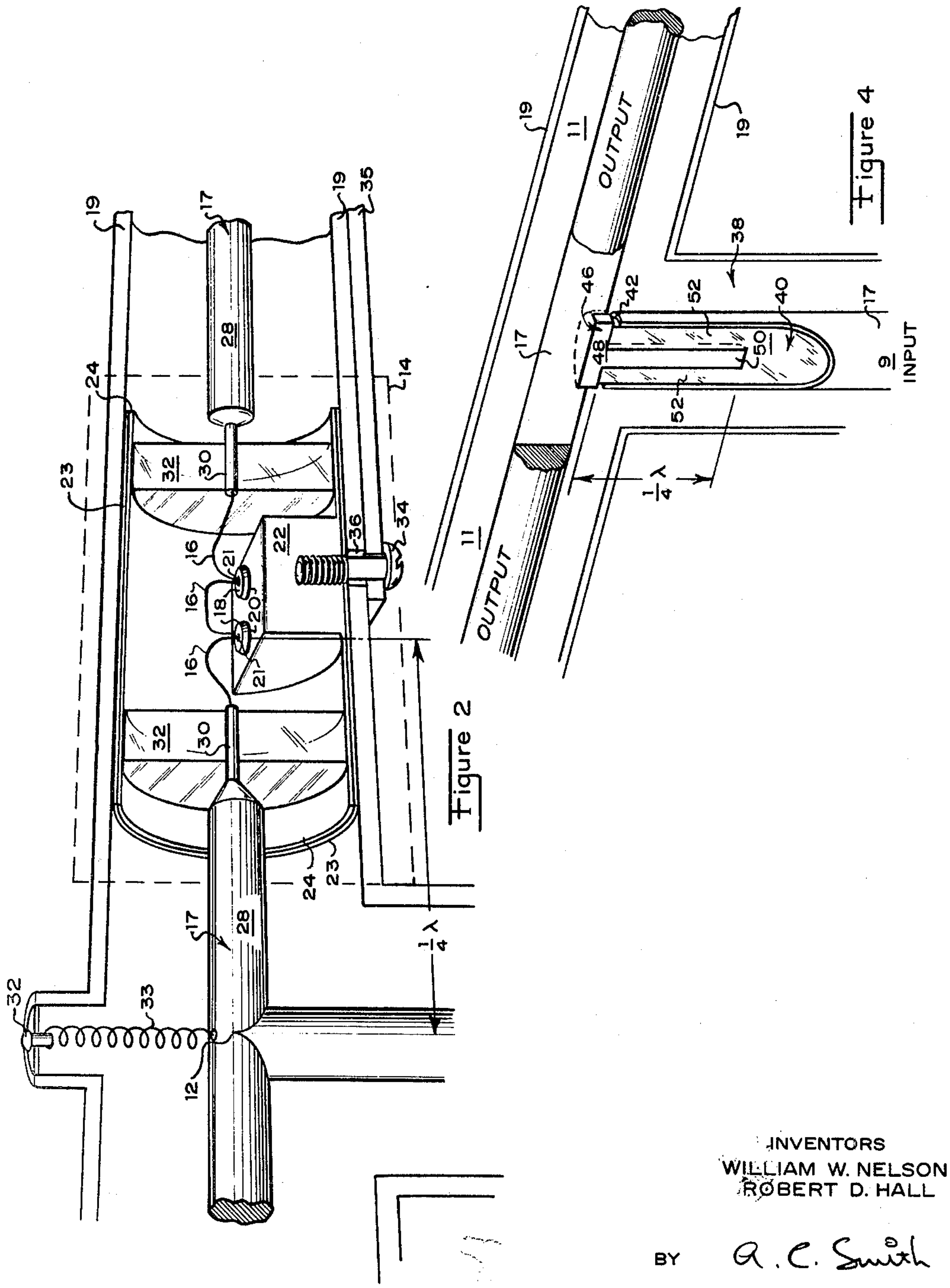
FIGURE 2 is a cut-away perspective view showing in detail one of the low-pass filter sections of the microwave switch of FIGURE 1.
FIGURE 4 is a cut-away perspective view showing in detail the auxiliary transmission line of FIGURE 3; and, FIGURE 5 is a schematic diagram of a double-pole double-throw microwave switch according to another embodiment of this invention.

Referring to FIGURE 2, there is shown in detail for the case of a two conductor coaxial transmission line one of the low-pass filter sections 14 shown schematically in FIGURE 1. Each of the diodes 18 comprises a thin semiconductor chip a few thousandths of an inch in thickness. One major face of each diode chip 18 is provided with a metal backing 20 and the other major face is provided with a metal contact terminal 21. The diode chips 18 are fixedly supported a finite distance apart with the metal backing 20 of each diode chip resting on an elevated portion 22 of a metallic cylinder 24. This metallic cylinder 24 is continuously separated from the inner surface of the outer conductor 19 of the coaxial transmission line by a dielectric sleeve 23. The dielectric sleeve 23 provides a capacitance between the metallic cylinder 24 and the outer conductor 19 of the coaxial transmission line. This effectively places the metallic cylinder 24 at ground potential for an R.F. signal. The center conductor 17 of the coaxial transmission line comprises two axially aligned portions 28 each of which terminates in a tapered end section 30 fixedly supported adjacent to a different one of the diode chips 18 by a dielectric bead 32. The three inductors 16 comprise three small wires serially connecting the tapered end sections 30 of the center conductor 17 and the metal contact terminal 21 of each of the diode chips 18. The length and diameter of the connecting wires is chosen to give the required inductances for the filter section 14. A first bias terminal 32 is connected to the outer conductor 19 and is inductively coupled to the center conductor 17 by the inductor 33. A second bias terminal 34 is insulated from the outer conductor 19 by an insulating layer 35 and is attached to the metallic cylinder 24 through a hole 36 in the outer conductor 19. These first and second bias terminals 32 and 34 are provided to permit selective reverse and forward biasing of the diode chips 18.

The diode chips 18 can be embedded in a wide variety of filter sections including, for example, many conventional low-pass and band-pass filter sections to achieve the desired design compromises between bandwidth and insertion loss or other performance characteristics. Using diode chips 18 within the present state of the art having, for example, two-tenths of a picofarad of capacitance a filter section 14 can be built with a bandwidth greater than ten kilomegacycles, an insertion loss less than one decibel, a VSWR less than 2:1, and isolation of thirty decibels or more. However, the bandwidth of the above-described multiple-throw microwave switch is limited by the quarter wavelength spacing of the filter sections 14 from the common junction 12.

Figure 3:
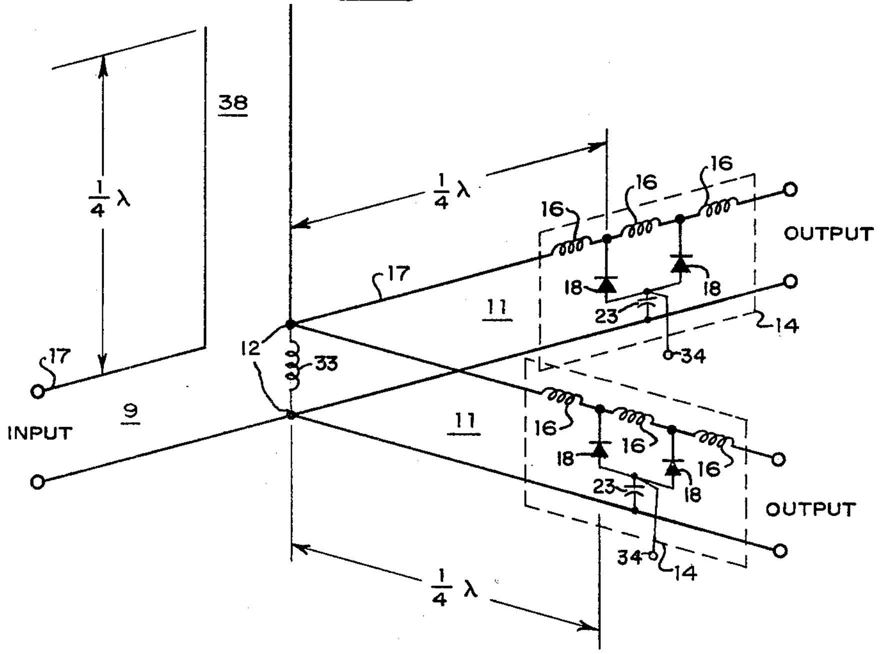
FIGURE 3 is a schematic diagram showing an auxiliary transmission line for increasing the bandwidth of the microwave switch of FIGURE 1.

The bandwidth of the above described multiple-throw microwave switch may be substantially increased by the addition of an auxiliary transmission line 38, as shown in FIGURE 3. The auxiliary transmission line 38 is connected to one conductor 17 of the input transmission line 9 near the common connection 12 between the transmission lines 9 and 11 and is terminated in an open circuit one-quarter of a wavelength from its place of connection to the input transmission line 9. This auxiliary transmission line 38 may be provided as shown in detail in FIGURE 4 for the case of a coaxial transmission line. The center conductor 17 of the input transmission line 9 is provided with a hollow portion 40 having an annular end 42 spaced a finite distance from the center conductor 17 of the output transmission lines 11. A conductive member 46 having a base portion 48 and a stem portion 50 is supported in coaxial alignment with the hollow portion 40 of the center conductor 17 of the input transmission line 9. The base portion 48 of this conductive member 46 is fixedly attached to the center conductor 17 of the output transmission lines 11 and is spaced a finite distance from the annular end 42 of the hollow portion 40. The stem portion 50 of this conductive member 46 is electrically one-quarter of a wavelength long and extends coaxially into the hollow portion 40 of the center conductor 17 of the input transmission line 9. A dielectric material 52 fills the space between the conductive member 46 and the adjacent walls of the hollow portion 40. By including in the power transmission paths of the microwave switch an auxiliary transmission line 38 such as that described above it is possible to reduce the VSWR from about 2:1 to less than 1.5:1 over an octave bandwidth.

Figure 5:
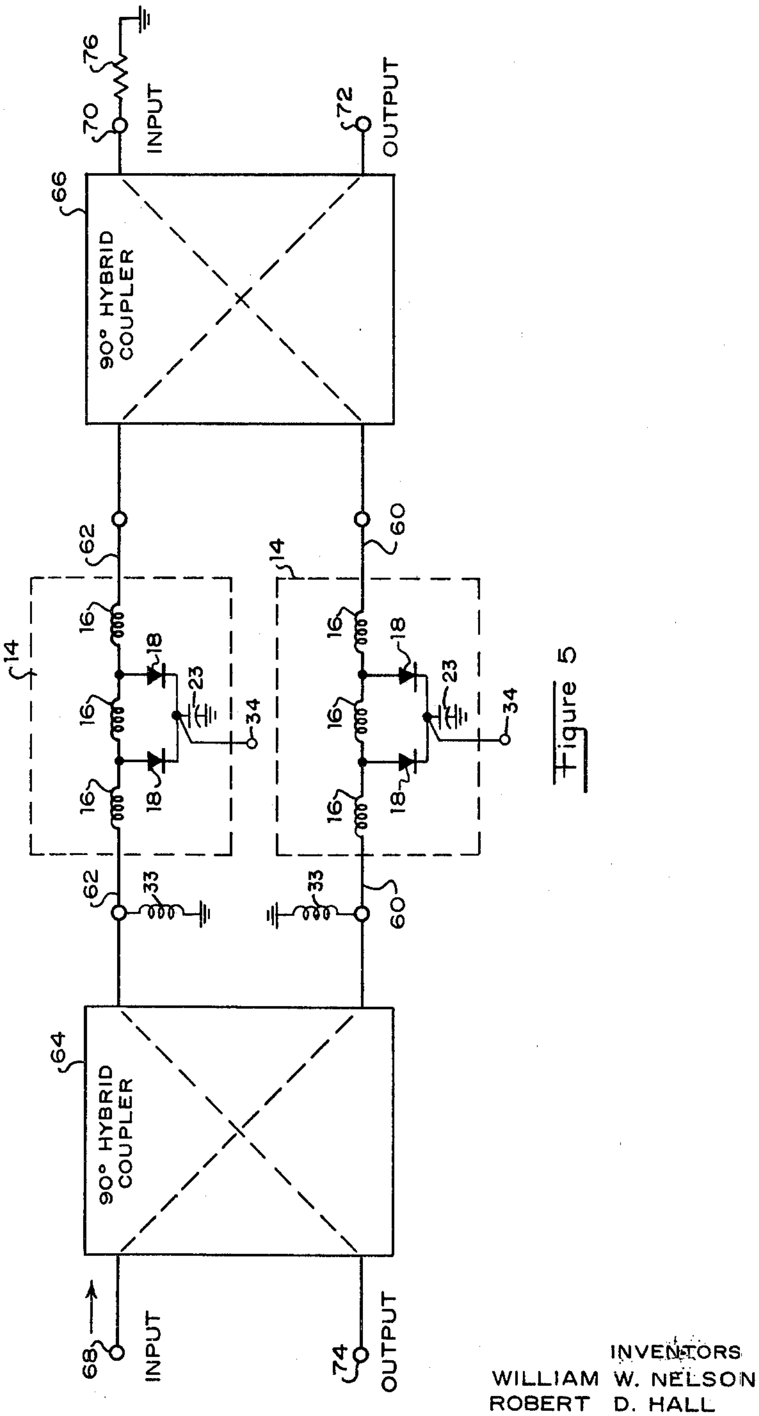

Referring now to FIGURE 5, there is shown a double-pole double-throw microwave switch comprising a pair of transmission lines 60 and 62 each of which includes a low-pass filter section 14 of the type described above in connection with FIGURES 1 and 2. Two hybrid couplers 64 and 66 connect each of these transmission lines 60 and 62 between a pair of input signal ports 68 and 70 and a pair of output signal ports 72 and 74.

The operation of this double-pole double-throw microwave switch is hereinafter explained for the illustrative case where signal is applied to the input signal port 68 and a load 76 is connected to the other input signal port 70. When all the diodes 18 are reverse biased so that both of the low-pass filter sections 14 are switched to the pass condition, one-half of the signal received at the input signal port 68 is applied in phase by the hybrid coupler 64 to the transmission line 60 and the other half is applied with a ninety degree phase shift by the hybrid coupler 64 to the transmission line 62. The in-phase signal applied to the transmission line 60 is transmitted to the hybrid coupler 66 which applies one-half of it in phase to the load 76 and the other half of it with a ninety degree phase shift to the output signal port 72. Similarly, the ninety degree out-of-phase signal applied to the transmission line 62 is transmitted to the hybrid coupler 66 which applies one-half of it without any additional phase shift to the output signal port 72 and the other half of it with an additional ninety degree phase shift to the load 76. All the signal applied to the output signal port 72 adds since it all bears the same ninety degree out-of-phase relationship with reference to the input signal. Since the signal applied to the load 76 from the transmission line 62 is one-hundred and eighty degrees out of phase with respect to the signal applied to the load 76 from the transmission line 60 there is effectively no power dissipated in the load 76. The only signal reaching the output signal port 74 is due to small reflections from the transmission lines 60 and 62 and may be readily dissipated in a load (not shown) which is connected to the output signal port 74 when the filter sections 14 are switched to the pass condition.

When the diodes are all forward biased so that both of the low-pass filter sections 14 are switched to the stop condition, one-half of the input signal received at the input signal port 68 is again applied in phase by the hybrid coupler 64 to the transmission line 60 and the other half is again applied with a ninety degree phase shift by the hybrid coupler 64 to the transmission line 62. However, the signal applied to the transmission lines 60 and 62 is reflected back to the hybrid coupler 64 because of the stop condition of the low-pass filter sections 14. One-half of the reflected in-phase signal from the transmission line 60 is applied in phase to the input signal port 68 and the other half is applied with a ninety degree phase shift to the output signal port 74. Similarly, one-half of the reflected ninety degree out-of-phase signal from the transmission line 62 is applied to the output signal port 74 without any additional phase shift and the other half is applied to the input signal port 68 with an additional ninety degree phase shift. All the reflected signal applied to the output signal port 74 adds since it all bears the same ninety degree out-of-phase relationship with reference to the input signal. Since the reflected signal applied to the input signal port 68 by the transmission line 62 is one-hundred and eighty degrees out of phase from the reflected signal applied to input signal port 68 by the transmission line 60, effectively no reflected signal is applied to the input signal port 68.

This microwave switch operates in the same manner as described above when the load 76 is removed and the input signal is applied to the input signal port 70. Thus, a double-pole double-throw microwave switch is provided which permits signal steering from either input signal port 68 or 70 to either output signal port 72 or 74, merely by selectively reverse and forward biasing the diodes 18.

We claim:

1. A multiple throw switch comprising:
   - a plurality of signal ports;
   - a plurality of signal transmission lines having a common connection at one end thereof each of said signal transmission lines including a filter section in which an asymmetrical conducting element is connected in shunt with the corresponding signal transmission line, is electrically spaced an odd number of quarter wavelengths from said common connection, and has one operating condition for passing a signal applied to the corresponding signal transmission line and another operating condition for blocking a signal applied to the corresponding signal transmission line;
   - coupling means for connecting the commonly connected end of each of said signal transmission lines to one of said signal ports and for connecting the other end of each of said signal transmission lines to a different one of the others of said signal ports to provide a different signal transmission path between said one signal port and each of said other signal ports so that a signal may be passed between said one signal port and any of said other signal ports as determined by the operating conditions of said asymmetrical conducting elements; and control means connected to said signal transmission lines for selectively setting said asymmetrical conducting elements to the operating conditions required for passing a signal along one of said signal transmission paths between said one signal port and a selected one of said other signal ports.

2. A multiple throw switch as in claim 1 wherein said coupling means includes an additional signal transmission line connecting the commonly connected end of each of said plurality of signal transmission lines in common to said one signal port.

3. A multiple throw switch as in claim 2 including an auxiliary signal transmission line connected to one of said signal transmission lines near said common connection, said auxiliary transmission line terminating in an open circuit substantially an odd number of quarter wavelengths from the signal transmission line to which it is connected.

4. A multiple throw switch as in claim 3 wherein said auxiliary signal transmission line is connected to said additional signal transmission line near said common connection.

5. A multiple throw switch as in claim 2 wherein:

each of said signal transmission lines includes a pair of conductors;

each of said filter sections includes at least a pair of reactive elements connected in series with one of the conductors of the corresponding signal transmission line; and said asymmetrical conducting element of each of said filter sections is connected in shunt between the conductors of the corresponding signal transmission line at a point intermediate said pair of reactive elements of the corresponding filter section.

6. A multiple throw switch as in claim 5 wherein:

the asymmetrical conducting element of each of said filter sections comprises a diode having a pair of terminals;

said pair of reactive elements of each of said filter sections comprises a pair of inductors connected in series with said one conductor of the corresponding signal transmission line, one terminal of the corresponding diode being connected to said one conductor of the corresponding signal transmission line at a point between said pair of inductors;

each of said filter sections includes capacitive coupling means for capacitively coupling the other terminal of the corresponding diode to the other conductor of the corresponding signal transmission line; and said control means includes bias terminal means connected to said other terminal of each of said diodes for applying a bias control signal to each of said diodes, said control means further including a D-C conduction path for connecting said one conductor to said other conductor in each of said plurality of signal transmission lines.

7. A multiple throw switch as in claim 6 wherein each of said filter sections includes:

an additional inductor connected in series with said one conductor of the corresponding signal transmission line; and an additional diode connected in shunt between the conductors of the corresponding signal transmission line, said additional diode having one terminal connected to said one conductor of the corresponding signal transmission line at a point between said additional inductor and one of said pair of inductors and having another terminal connected to said bias terminal means and capacitively coupled to said other conductor of the corresponding signal transmission line by said capacitive coupling means.

8. A multiple throw switch comprising:

four signal ports;

a pair of signal transmission lines, each of said signal transmission lines including a filter section having at least one asymmetrical conducting element with a first operating condition for passing a signal applied to the corresponding signal transmission line and a second operating condition for blocking a signal applied to the corresponding signal transmission line;

a pair of hybrid couplers coupling each of said signal transmission lines in signal transmission paths of substantially the same electrical length between said four signal ports so that a signal is passed between a first and a second of said signal ports when said asymmetrical conducting elements are set to the first operating condition and is passed between the first and a third of said signal ports when said asymmetrical conducting elements are set to the second operating condition; and control means connected to said signal transmission lines for selectively setting said asymmetrical conducting elements to the first operating condition for passing a signal between said first and second signal ports and to the second operating condition for passing a signal between said first and third signal ports.

9. A multiple throw switch as in claim 8 wherein:

each of said filter sections includes at least a pair of inductive elements connected in series with one of the conductors of the corresponding signal transmission line; and said asymmetrical conducting element of each of said filter sections is connected in shunt between the conductors of the corresponding signal transmission line at a point intermediate said pair of inductive elements of the corresponding filter section.

10. A multiple throw switch comprising:

a plurality of signal ports;

a plurality of signal transmission lines, each of said signal transmission lines having a pair of conductors and including a filter section in which three inductors are connected in series with one of said conductors of the corresponding signal transmission line, in which a first diode is connected in shunt between said conductors of the corresponding signal transmission line at a point intermediate a first pair of said inductors, and in which a second diode is connected in shunt between said conductors of the corresponding signal transmission line at a point intermediate a second pair of said inductors, said diodes having one operating condition for passing a signal applied to the corresponding signal transmission line and another operating condition for blocking a signal applied to the corresponding signal transmission line;

coupling means for connecting one end of each of said signal transmission lines to one of said signal ports and for connecting the other end of each of said signal transmission lines to a different one of the others of said signal ports to provide a different signal transmission path between said one signal port and each of said other signal ports so that a signal may be supplied between said one signal port and any of said other signal ports as determined by the operating conditions of said diodes; and control means connected to said signal transmission lines for selectively setting said diodes to the operating conditions required for passing a signal along one of said signal transmission paths between said one signal port and a selected one of said other signal ports.

References Cited

UNITED STATES PATENTS

| | | | |
|---|---|---|---|
| 3,321,717 | 5/1967 | Harper | 333—7 |
| 3,337,820 | 8/1967 | Harper | 333—7 |
| 3,079,571 | 2/1963 | Elliot et al. | 333—70 |
| 3,148,344 | 9/1964 | Kaufman | 333—70 |
| 3,164,792 | 1/1965 | Georgiev et al. | 333—73 |
| 3,179,816 | 4/1965 | Hall et al. | 333—7 XR |
| 3,245,014 | 4/1966 | Plutchok et al. | 333—7 XR |
| 3,223,947 | 12/1965 | Clar | 333—7 |

HERMAN KARL SAALBACH, Primary Examiner.

MARVIN NUSSBAUM, Assistant Examiner

U.S. Cl. X.R.

307—259; 333—11, 73